United States Patent Office.

DAVID LUBLINSKI, OF SCHWETZ, PRUSSIA, GERMANY.

MIXED PAINT.

SPECIFICATION forming part of Letters Patent No. 327,447, dated September 29, 1885.

Application filed July 6, 1885. (No specimens.)

*To all whom it may concern:*

Be it known that I, DAVID LUBLINSKI, a subject of the King of Prussia, Germany, residing at the city of Schwetz, in the Kingdom of Prussia, Germany, have invented certain new and useful Improvements in Paint Compositions, of which the following is a specification.

This invention relates to an improved paint composition for timber, stone, iron, and other substances, so as to protect them against decomposition, corrosion, and growth of fungi; and the invention consists of a mixture of linseed-oil, colophony, petroleum, levigated litharge, sulphate of zinc, potash-alum, and carbolic acid.

The antiseptic and anticorrosive substance is prepared in the following proportions: Two thousand five hundred parts of linseed-oil, three thousand one hundred and twenty-five parts of colophony, one thousand eight hundred and twenty-five parts of refined petroleum, one hundred and twenty-five parts of levigated litharge, fifty parts of pulverized sulphate of zinc, one thousand parts of pulverized potash-alum, and twenty-five parts of crude carbolic acid of fifteen to twenty per cent. are mixed together by being slowly heated under continuous stirring and then exposed to boiling for about two hours. The solution is then allowed to rest for two days, after which the same is decanted, while the residue is filtered and the filtered portion added to the decanted solution.

The paint composition thus obtained can be used for impregnating wood, iron, and other substances, either singly or by mixing the same with pigments, so as to give it several coats of paint, which then have the property of preserving wood from decomposition and the iron from rust. It prevents the decaying of wood, serves as a preventative against the growth of fungi, and destroys fungi already formed by simply impregnating these parts with the solution. When used without pigments, the solution forms a varnish-like coating to the articles impregnated therewith, which after the second coat imparts a glossy surface to the same.

Having thus described my invention, I claim as new and desire to secure by Letters Patent—

A composition for painting wood, metal, and stone, consisting of a solution of linseed-oil, colophony, petroleum, litharge, sulphate of zinc, potash-alum, and carbolic acid, substantially as set forth.

In testimony whereof I have signed my name to this specification in the presence of two subscribing witnesses.

DAVID LUBLINSKI.

Witnesses:
 A. MÜHLE,
 B. ROI.